A. W. OLDS.
Breech Strap Fastening
No. 49,143.  Patented Aug. 1, 1865.
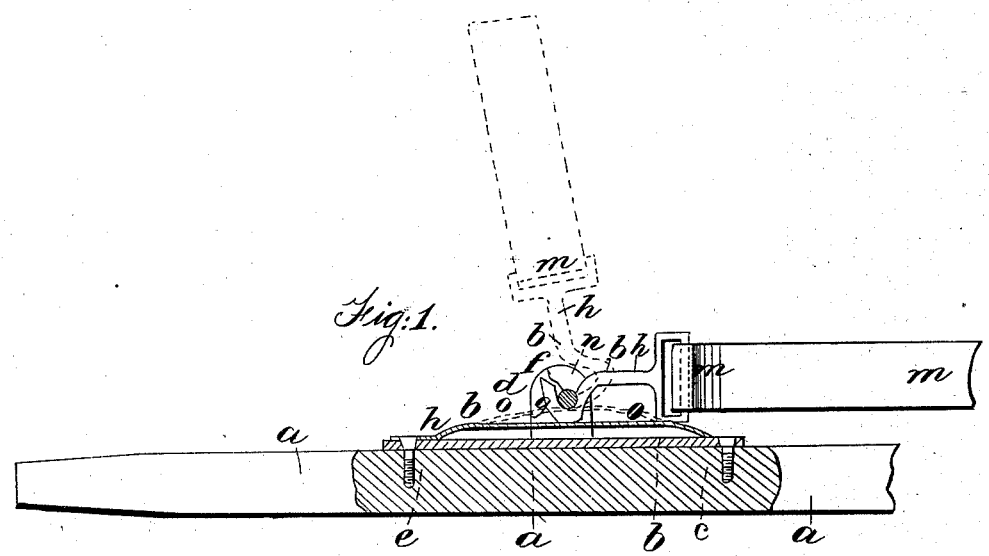
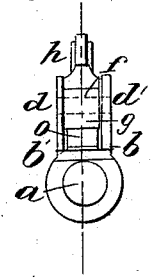
Witnesses
Theo. Tusch
Wm. Trewrn
Inventor
A W Olds
per Munn & Co
Attorneys

UNITED STATES PATENT OFFICE.

A. W. OLDS, OF GREEN OAK, MICHIGAN.

IMPROVED BREECHING-STRAP FASTENING.

Specification forming part of Letters Patent No. 49,143, dated August 1, 1865.

*To all whom it may concern:*

Be it known that I, A. W. OLDS, of Green Oak, in the county of Livingston and State of Michigan, have invented a new and Improved Breech-Strap Fastening; and I do hereby declare that the following is a full, clear, and exact description thereof, which will enable those skilled in the art to make and use the same, reference being had to the accompanying drawings, forming part of this specification.

The present invention relates to certain new and useful improvements in mode of fastening the holdback or breeching straps of harnesses to and upon the shafts of carriages, and has for its principal object the production of such a fastening therefor as will allow them to be easily and readily disengaged from the shafts by the forward movement of the horse within the same, the trace-straps or tugs first having been unfastened from the whiffletree in any proper manner. I secure this result by looping each breeching-strap through and in one end of a short hook, the hook end of which is partially passed under and around a fixed horizontal pin held in and between two parallel standards secured to and upon the shaft, and in such a manner as to bring the looped end of the straps toward the rear ends of the shafts, and is held in connection with the said pin, so as to prevent its slipping or working off of the same as the carriage is being drawn, by means of a bent or any other suitable shaped spring attached to the shaft in any proper position to bear upward and against the hook, whereby, when desired to release the horse from the shaft, first unhooking the trace-straps from the whiffletree, its forward movement then within them will necessarily bring the breech-hooks in such a position with regard to the pins upon which they are secured as to be quickly thrown off and disengaged therefrom, thereby allowing the horse to freely move out of the shafts, as is evident, and the advantages of which in case of accidents are too well known to need any particular mention or enumeration herein.

In the accompanying plate of drawings my improvements are represented, Figure 1 being a partial sectional view of a shaft, taken in the direction of its length, showing my improvements applied thereto, and with the breeching-hook secured thereupon; and Fig. 2, a cross-section, showing one end of the breech-fastening.

$a\ a$ in the drawings represent a portion of the shaft of a carriage, made of any of the usual forms and materials; $b\ b$, a metallic plate secured to and upon the upper portion of the shaft in the direction of its length by means of screws $c\ c$, or in any other proper manner, and having two parallel and vertical standards, $d\ d$, in and between which, and extending entirely across from one to the other, is a pivot or rod, $f$.

$g$ is a hook, made of a bar or plate of metal of the same width, or nearly so, as the space between the standards $d\ d$ of the shaft, in the end $h$ of the shank $l$ of which the holdback or breeching-strap $m$ is looped. This hook, $g$, when desired to harness the horse within the shafts, is placed over and upon the pivot of the standards $d$, and extending partially around the same, with its open part $n$ at the upper side thereof, and with the end in which the breeching-strap is looped, as described, toward the inner or rear portion of the shaft, a bent spring, $o$, placed lengthwise upon the metallic plate $b$, and secured at one end, $p$, thereto, tightly holding the hook upon its pivot of the shaft, as is plainly seen in Fig. 1. When desired to relieve the breeching-strap from the shaft it is only necessary to turn its hook upon the pivot or bearing on the shaft sufficient to bring it into a vertical position therewith, or nearly so, the spring $o$ then forcing or throwing it off, as is evident without further description.

From the above it is manifest that by securing the breeching-strap to the shaft by means of a hook in which it is looped, as described, it can be easily and readily disengaged therefrom in case of accidents, or when the horse is being unharnessed, and by the simple forward movement of the horse within the shafts.

It may be here remarked that the spring $o$ can be dispensed with, if desired, and in lieu thereof a cross-bar or plate inserted between the standards of the shaft in proper position to cause the hook to be disengaged, in a manner similar to the spring; but it is evident it would not be so good or advantageous as a spring.

In lieu of a bent spring, any of the various kinds may be used—as, for instance, a spiral, rubber, &c.—and therefore I do not intend to limit myself to the use only of the spring described.

I claim as new and desire to secure by Letters Patent—

1. Securing the breeching-straps to shafts of carriages by means of a hook, in one end of which the strap is looped, in combination with a fixed pin or staple of the shaft, on which the hook is hung, arranged together and operating substantially in the manner described, and for the purpose specified.

2. In combination with the above, the use of a spring, substantially as and for the purpose specified.

The above specification of my invention signed by me this 25th day of May, 1865.

A. W. OLDS.

Witnesses:
ALBERT W. BROWN,
M. M. LIVINGSTON.